US011209589B2

(12) United States Patent
Liu et al.

(10) Patent No.: US 11,209,589 B2
(45) Date of Patent: Dec. 28, 2021

(54) OPTICAL IMAGING SYSTEM

(71) Applicant: 3M INNOVATIVE PROPERTIES COMPANY, St. Paul, MN (US)

(72) Inventors: Tao Liu, Woodbury, MN (US); Brent A. Hedding, Hudson, WI (US); David C. Mercord, Prescott, WI (US); Brian W. Ostlie, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/466,054

(22) PCT Filed: Nov. 28, 2017

(86) PCT No.: PCT/IB2017/057454
§ 371 (c)(1),
(2) Date: Jun. 3, 2019

(87) PCT Pub. No.: WO2018/104823
PCT Pub. Date: Jun. 14, 2018

(65) Prior Publication Data
US 2020/0073041 A1 Mar. 5, 2020

Related U.S. Application Data

(60) Provisional application No. 62/430,419, filed on Dec. 6, 2016.

(51) Int. Cl.
*B60K 35/00* (2006.01)
*F21V 8/00* (2006.01)

(52) U.S. Cl.
CPC ............. *G02B 6/006* (2013.01); *G02B 6/001* (2013.01); *B60K 35/00* (2013.01);
(Continued)

(58) Field of Classification Search
CPC ..................................................... G02B 6/006
See application file for complete search history.

(56) References Cited

U.S. PATENT DOCUMENTS 5,509,223 A    4/1996   Jung
7,104,678 B2 *   9/2006   De Lamberterie .. B60Q 1/0052
                                                                                                                    362/560
(Continued)

FOREIGN PATENT DOCUMENTS

WO    WO 2010/077367      7/2010

OTHER PUBLICATIONS

International Search Report for PCT International Application No. PCT/IB2017/057454, dated Mar. 9, 2018, 5 pages.

*Primary Examiner* — Chris H Chu
(74) *Attorney, Agent, or Firm* — Jonathan L. Tolstedt

(57) ABSTRACT

An optical imaging system (100) including an elongated lightguide (105) having pluralities of first and second light extractors (110) forming respective first and second patterns along the length of the lightguide is described. Light extracted by the first light extractors exit the lightguide primarily along a first direction toward a target location (150), and light extracted by the second light extractors exit the lightguide primarily along a second direction different from the first direction. The optical imaging system includes a first reflector (114) for receiving light exiting the lightguide primarily along the second direction and reflecting the received light toward the target location. The first reflector forms a first virtual image (132) of the second pattern behind the first reflector. The first pattern and the first virtual image are visible to a viewer (152) viewing the optical imaging system from the target location.

10 Claims, 13 Drawing Sheets

(52) U.S. Cl.
CPC ............... *B60K 2370/155* (2019.05); *B60K 2370/1529* (2019.05); *B60K 2370/167* (2019.05); *B60K 2370/31* (2019.05); *B60K 2370/336* (2019.05)

(56) References Cited

U.S. PATENT DOCUMENTS

| | | | |
|---|---|---|---|
| 2002/0061178 A1* | 5/2002 | Winston | G02B 6/0053 385/133 |
| 2003/0223250 A1 | 12/2003 | Ballen | |
| 2004/0184286 A1 | 9/2004 | De Lamberterie | |
| 2010/0073955 A1* | 3/2010 | Cornelissen | G02B 6/0038 362/554 |

* cited by examiner

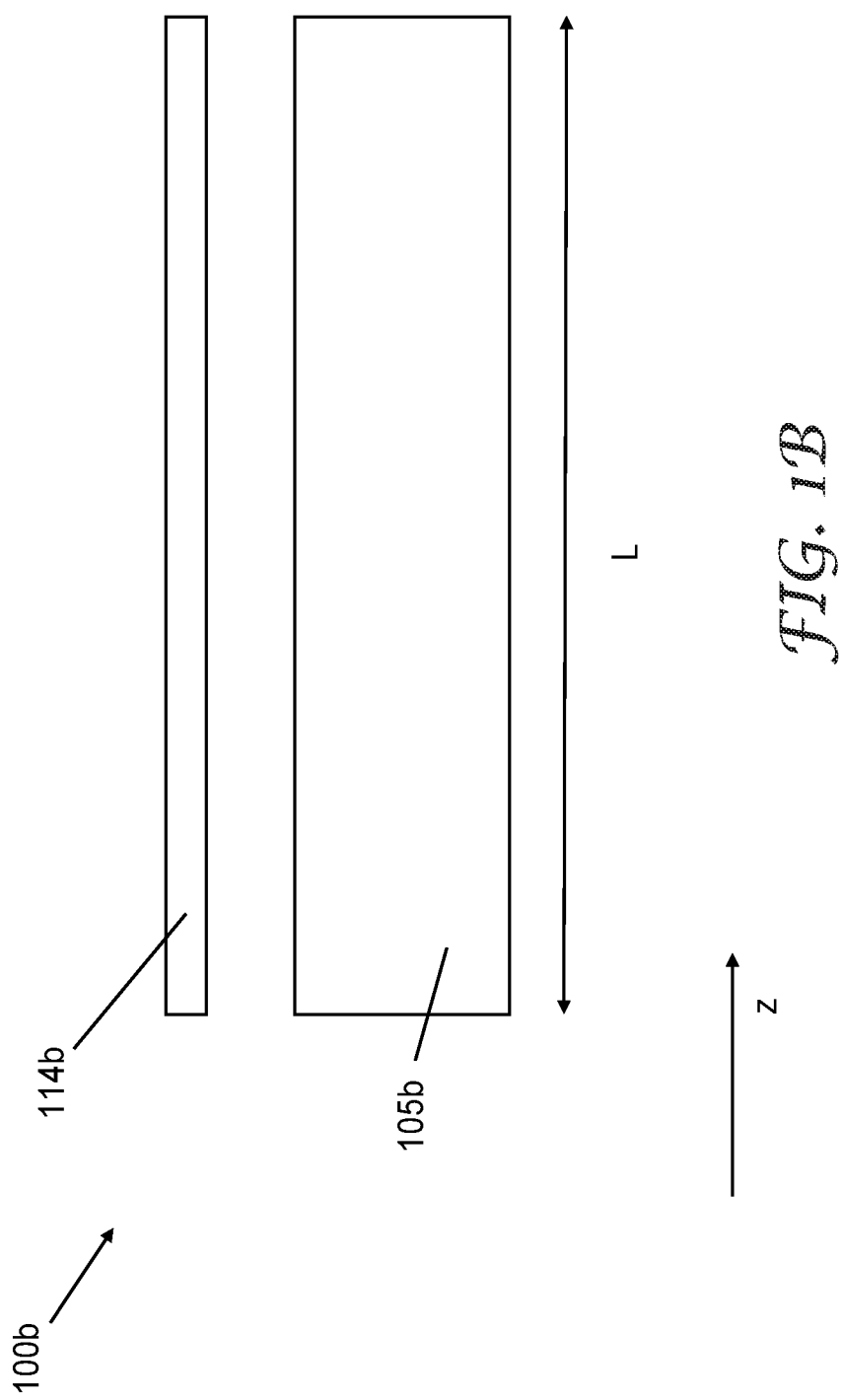

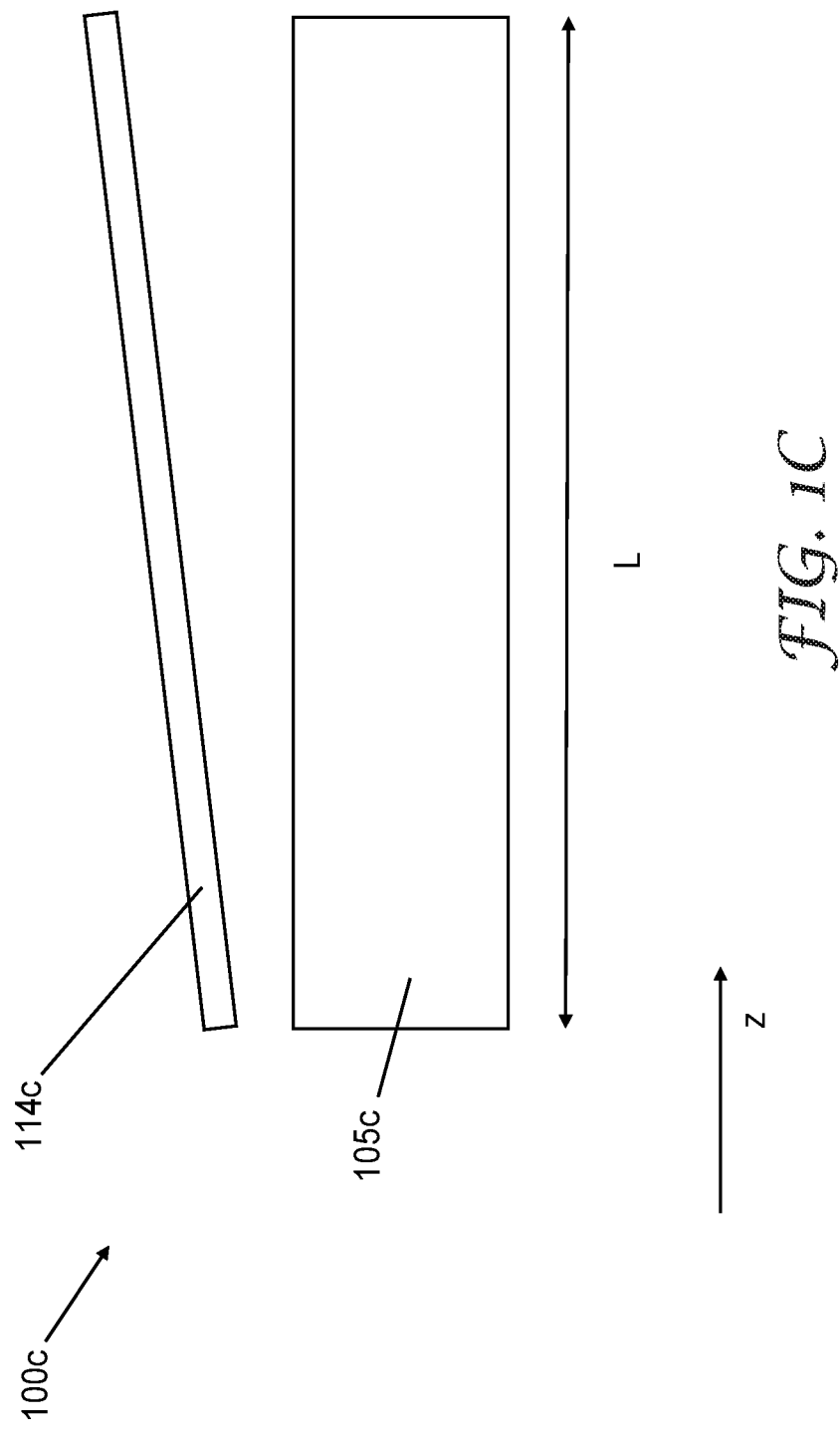

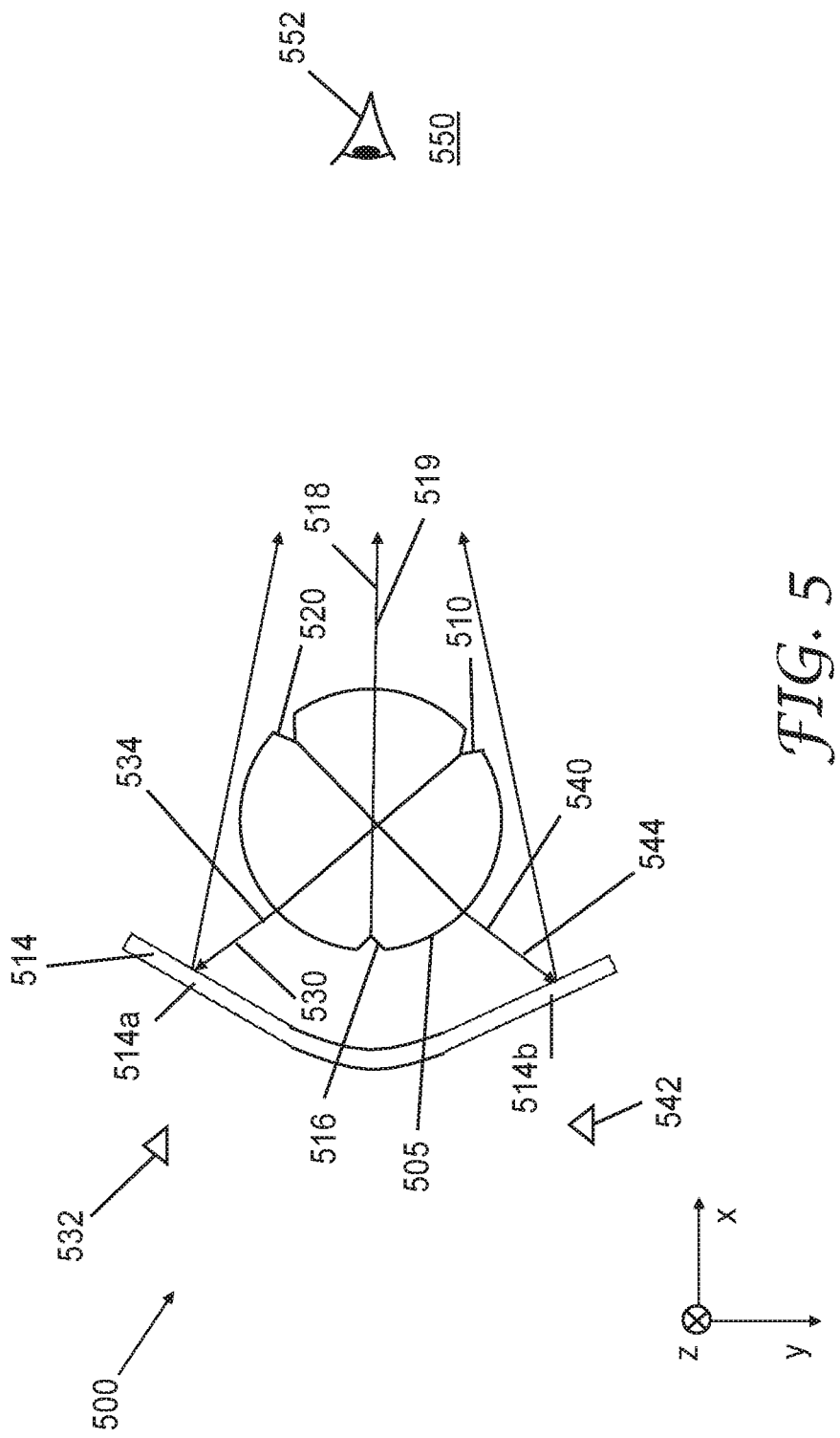

OPTICAL IMAGING SYSTEM

BACKGROUND

Lightguides may be used to provide illumination in various applications such as strip and panel lighting. A lightguide may include a plurality of notches such that light striking the notches is reflected out of the lightguide.

SUMMARY

In some aspects of the present description, an optical imaging system including an elongated lightguide extended along a length of the lightguide and including a first reflector is provided. The lightguide includes pluralities of first and second light extractors which extract light that would otherwise be confined and propagate within the lightguide along the length of the lightguide primarily by total internal reflection. The first and second light extractors form respective first and second patterns along the length of the lightguide such that light extracted by the first light extractors exit the lightguide primarily along a first direction toward a target location and light extracted by the second light extractors exit the lightguide primarily along a second direction different from the first direction. The first reflector receives light exiting the lightguide primarily along the second direction and reflects the received light toward the target location. The first reflector forms a first virtual image of the second pattern behind the first reflector. The first pattern and the first virtual image are visible to a viewer viewing the optical imaging system from the target location.

In some aspects of the present description, an optical imaging system including an elongated lightguide an elongated first reflector coextensive with the lightguide is provided. The lightguide includes a plurality of first light extractors forming a first pattern. The first light extractors are configured to extract light propagating within the lightguide such that the extracted light propagates away from a target location. The elongated first reflector forms a first virtual image of the first pattern such that the extracted light is redirected by the first reflector toward the target location making the first virtual image viewable at the target location.

BRIEF DESCRIPTION OF THE DRAWINGS

FIGS. 1B-1C are schematic cross-sectional view of optical imaging systems along the length of a lightguide;

FIG. 5 is a schematic cross-sectional view of an optical imaging system;

DETAILED DESCRIPTION

Figure 1A:
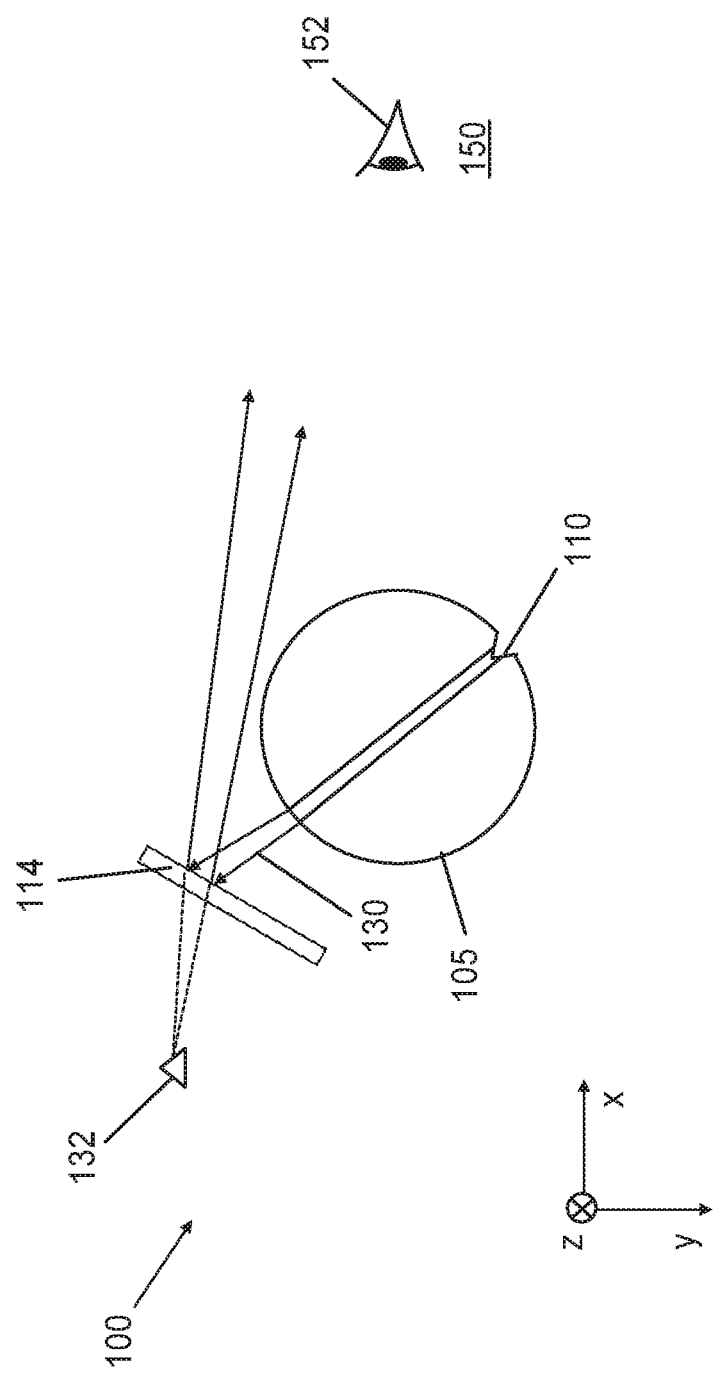
FIG. 1A is a schematic cross-sectional view of an optical imaging system in a direction perpendicular to the length of a lightguide.

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some aspects of the present description, an optical imaging system is provided which includes an elongated lightguide including light extractors which form a pattern and which extracts light away from a target location towards a reflector which redirects the extracted light to the target location. A virtual image of the pattern is formed behind the reflector and is visible to a viewer at the target location. The lightguide may also include other light extractors which extract light towards a different second reflector or towards a different second portion of a single reflector. The lightguide may further include other light extractors which extract light directly towards the target location. In some embodiments, the lightguide is disposed between the reflector and the target location. In some embodiments, the optical imaging system provides a perceived depth of the patterns provided by the light extractors when viewed from the target location. For example, in some embodiments, three distinct patterns, which may be similar or different patterns, of extracted light are provided at the target location and the three patterns appear to have a three-dimensional arrangement when viewed from the target location. The perceived depth of the patterns can be adjusted by a suitable selection of the distance between the reflector(s) and the lightguide. The number of patterns provided by the optical imaging system at the target location is not particularly limited and may be, for example, from 1 to 10 or from 2 to 5.

Lightguides described herein may include a core and may optionally include a cladding surrounding the core. Light propagating through a lightguide may be confined to the lightguide primarily through total internal reflections at an outer surface of the core of the lightguide. A cladding layer may optionally be used to improve total internal reflection at the outer surface of the core of the lightguide when the lightguide contacts another object. Alternatively, an air interface may be present at an outer surface of the core. Light extracting structures, which may extend into the core of the lightguide or which may protrude from an exterior surface of the lightguide, for example, can be included to extract light from the lightguide in a desired direction.

The lightguides or the core of the lightguides of the present description may be made from an optically clear polymeric material or a glass, for example. Suitable polymeric materials include acrylates such as polymethyl methacrylate (PMMA), polycarbonate, and polyurethane, for example. Lightguides having light extracting features can be made by injection molding, for example. Alternatively, the lightguides can be made by first forming the lightguides without light extracting features and then creating the light extracting features through a subsequent processing step. The lightguides can be formed without light extracting structures, by extrusion or by molding, for example. The light extracting structures can then be formed by etching, laser ablation, or embossing, for example. A cladding layer may optionally be added to the lightguide either before or after the light extracting structures are formed. The cladding material may be any material having a lower refractive index than the core of the lightguide. Suitable materials for the cladding layer include fluoropolymers, for example. In some embodiments, no cladding layer is added.

The lightguides may be extended along a length of the lightguide where the length is at least 5 times or at least 10 times a largest lateral dimension (e.g., a diameter in the case of a lightguide with a circular cross-section or a diagonal length in the case of a lightguide with a rectangular cross-section) of the lightguide. In some embodiments, the largest lateral dimension of a cross-section of a lightguide perpendicular to the length of the lightguide is in a range of 1 mm, or 2 mm, or 3 mm to 15 mm, or 20 mm, or 25 mm, while a length of the lightguide is at least 5 cm, or at least 10 cm, or at least 25 cm. The lightguide may have a length of up to 2 m, or up to 10 m, for example. In some embodiments, the lightguide is linear and in other embodiments the lightguide is non-linear. In embodiments where the lightguide non-linear, the length of the lightguide refers to the length along the non-linear curve of the main axis of the lightguide. For example, as described further elsewhere herein, in some embodiments, the lightguide is toroidal and in this case the length of the lightguide refers to the circumference measured along the main axis of the lightguide.

FIG. 1A is a schematic cross-sectional view of optical imaging system 100 including a lightguide 105, which is elongated in the z-direction referring to the x-y-z coordinate system of FIG. 1A, and first reflector 114 which may be elongated in the z-direction and may be coextensive with the lightguide 105. The lightguide 105 includes a plurality of first light extractors 110 forming a first pattern (see, e.g., the patterns illustrated in FIGS. 9-12). The first light extractors 110 are configured to extract light propagating within the lightguide 105. The extracted light 130 propagates away from a target location 150 and reflects from the elongated first reflector 114 such that the extracted light is redirected by the first reflector 114 toward a target location 150. The first reflector 114 forms a first virtual image 132 of the first pattern which is viewable at the target location 150 by a viewer 152. The first virtual image 132 is behind the first reflector 114 in that it is on a side of the first reflector 114 opposite the target location 150.

Lightguide 105 may be substantially straight (e.g., nominally straight but with some curvature due to manufacturing variations or due to sag of the lightguide under gravity) or may be curved (e.g., toroidal). The first reflector 114 may be planar, may be curved along a first axis (e.g., the z-axis), or may be curved along mutually orthogonal first and second axes (e.g., the y- and z-axes).

First reflector 114 may be parallel or non-parallel with the lightguide 105. FIG. 1B is a schematic cross-sectional view of optical system 100b along the length L of the lightguide 105b. First reflector 114b is coextensive with and parallel to the lightguide 105b. Optical system 100b, lightguide 105b and first reflector 114b may correspond to optical system 100, lightguide 105 and first reflector 114, respectively. FIG. 1C is a schematic cross-sectional view of optical system 100c along the length L of the lightguide 105c. First reflector 114c is coextensive with and non-parallel to the lightguide 105c. Optical system 100c, lightguide 105c and first reflector 114c may correspond to optical system 100, lightguide 105 and first reflector 114, respectively.

As described further elsewhere herein, an additional plurality of light extractors may also be included which extract light directly towards the target location and/or an additional plurality of light extractors may also be included which extract light towards a second reflector or towards a different second portion of the first reflector.

Figure 2:
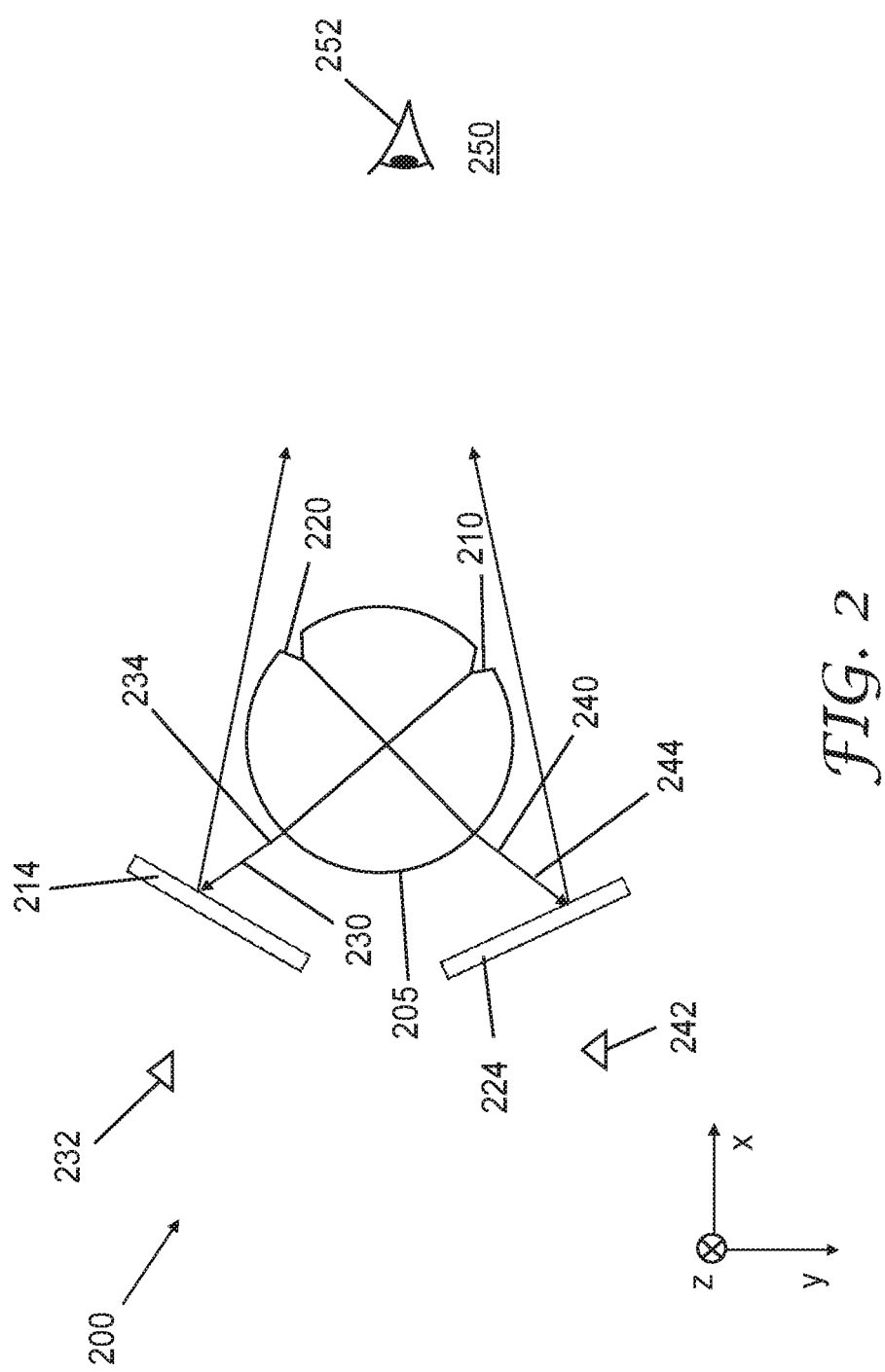
FIGS. 2-3 are schematic cross-sectional views of optical imaging systems.

FIG. 2 is a schematic cross-sectional view of optical imaging system 200 including an elongated lightguide 205 and elongated first and second reflectors 214 and 224, each of which may be coextensive with the elongated lightguide 205. The lightguide 205 includes a plurality of first light extractors 110 forming a first pattern along the length of the lightguide and a plurality of second light extractors 220 forming a second pattern along the length of the lightguide 205. The first and second light extractors 210 and 220 are configured to extract light propagating within the lightguide 205. The light 230 extracted by the first light extractors 210 exits the lightguide primarily along a first direction 234 and the light 240 extracted by the second light extractors 220 exits the lightguide primarily along a second direction 244 different from the first direction. The first reflector 214 receives the light 230 exiting the lightguide primarily along the first direction 234 (e.g., in a beam of light centered along the first direction) and reflects the received light 240 toward the target location 250. The second reflector 224 receives the light 240 exiting the lightguide primarily along the second direction 244 and reflects the received light 240 toward the target location 250. The first reflector 214 forms a first virtual image 232 of the first pattern behind the first reflector 214, and the second reflector 224 forms a second virtual image 242 of the second pattern behind the second reflector 224. The first and second virtual images 232 and 242 are visible to a viewer 252 viewing the optical imaging system 200 from the target location 250. In some embodiments, when viewed by a viewer 252, the first and second virtual images 232 and 242 are substantially equally bright. For example, in some embodiments, the first virtual image 232 has a brightness within 10 percent of that of the second virtual image 242 when viewed at the target location 250. Brightness refers to the photometric brightness or luminance (measured in candela per square meter, for example) except where indicated otherwise.

As described further elsewhere herein, an additional plurality of light extractors may also be included which extract light directly towards the target location.

Figure 3:
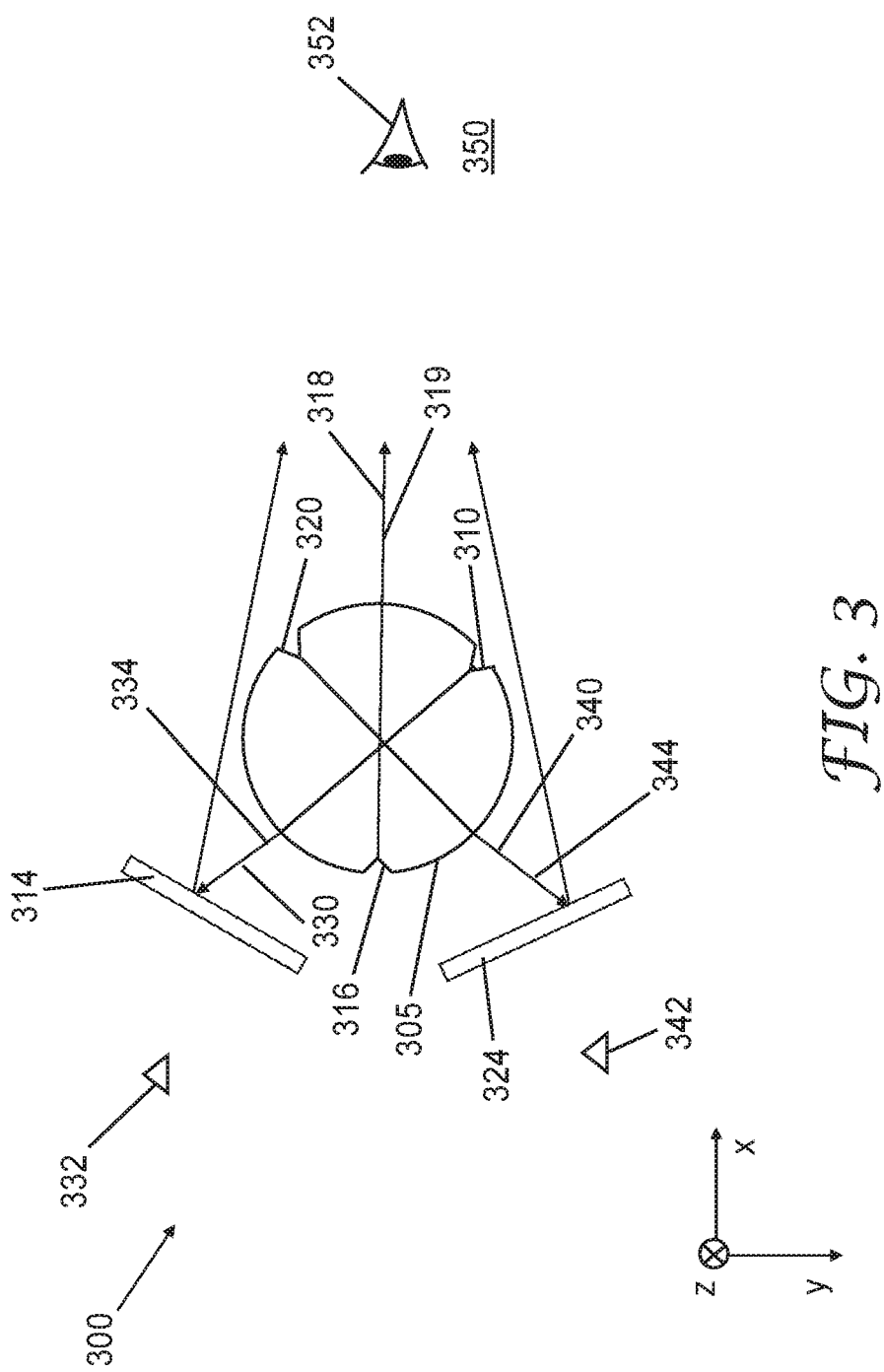

FIG. 3 is a schematic cross-sectional view of optical imaging system 300 including an elongated lightguide 305 extended along a length of the lightguide 305 and comprising pluralities of first and second light extractors 316 and 310 extracting light that would otherwise be confined and propagate within the lightguide along the length of the lightguide 305 primarily by total internal reflection. The first and second light extractors 316 and 310 form respective first and second patterns along the length of the lightguide 305. The light 318 extracted by the first light extractors exits the lightguide primarily along a first direction 319 toward a target location 350. The light 330 extracted by the second light extractors 310 exits the lightguide primarily along a second direction 334 different from the first direction 319. A first reflector 314 is disposed to receive light 330 exiting the lightguide 305 primarily along the second direction 334 and to reflect the received light 330 toward the target location 350 forming a first virtual image 332 of the second pattern behind the first reflector 314. In some embodiments, when viewed by a viewer 352, the first pattern and the first virtual image 332 are substantially equally bright. For example, in some embodiments, the first virtual image 332 has a brightness within 10 percent of that of the first pattern when viewed at the target location 350.

In the illustrated embodiment, the elongated lightguide 305 further comprises a plurality of third light extractors 320 forming a third pattern along the length of the lightguide 305. Light 340 extracted by the third light extractors 320 exits the lightguide 305 primarily along a third direction 344 different from the first and second directions 319 and 334. The optical imaging system 300 further includes a second reflector 324 for receiving light 340 exiting the lightguide 305 primarily along the third direction 344 and reflecting the received light 340 toward the target location 350 forming a second virtual image 342 of the third pattern behind the second reflector 324. The first pattern and the first and second virtual images 332 and 342 are visible to a viewer 352 viewing the optical imaging system 300 from the target location 350. The second and third light extractors 310 and 320 may correspond to the first and second light extractors 210 and 220, respectively. In alternative embodiments, the plurality of third light extractors 320 and the second reflector 324 are omitted. In some embodiments, when viewed by a viewer 352, the first pattern and the second virtual image 342 are substantially equally bright. For example, in some embodiments, the second virtual image 342 has a brightness within 10 percent of that of the first pattern when viewed at the target location 350. In some embodiments, when viewed by a viewer 352, the first pattern and the first and second virtual images 332 and 342 are substantially equally bright. In other embodiments, when viewed by a viewer 352, the first pattern and the first and second virtual images 332 and 342 have different brightnesses.

The first and second reflectors 214 and 224, or 315 and 324, may be parallel or not parallel to one another. For example, the first and second reflectors 214 and 225, or 315 and 325, may be disposed with an angle of between 90 and 180 degrees between the reflectors (see, e.g., FIG. 4A). One or both of the first and second reflectors 214 and 225, or 314 and 325, or reflector 114, may be curved about one or about two orthogonal axes or may be planar. In some embodiments, the first reflector is parallel to the lightguide (as in FIG. 1B) and the second reflector is parallel to the lightguide (also as in FIG. 1B). In some embodiments, the first and second reflectors and the lightguide are not parallel to one another (for example, one or both of the first and second reflectors may be non-parallel to the lightguide as in FIG. 1C).

Figure 4A:
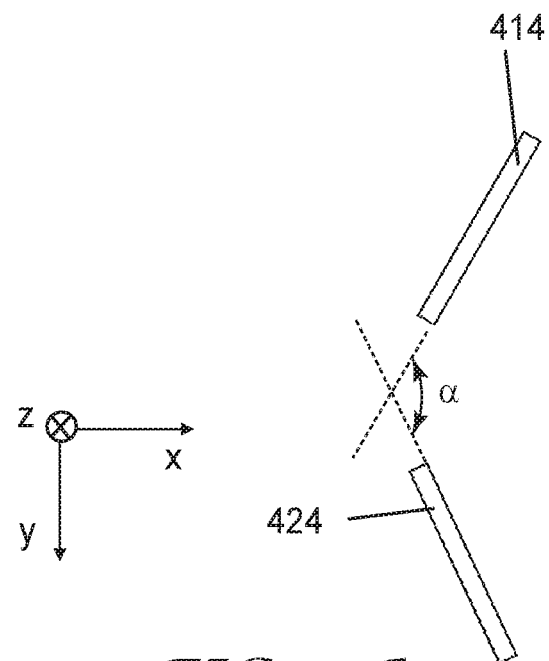
FIG. 4A is a schematic cross-sectional view of first and second reflectors.

FIG. 4A is a schematic cross-sectional view of first and second reflectors 414 and 424, corresponding to first and second reflectors 314 and 324, respectively, showing an angle α between the first and second reflectors 414 and 424. In some embodiments, the angle α is at least 90 degrees or at least 95 degrees, and no more than 180 degrees or no more than 170 degrees. In some embodiments, the angle α is between 90 and 180 degrees, for example.

Figure 4B:
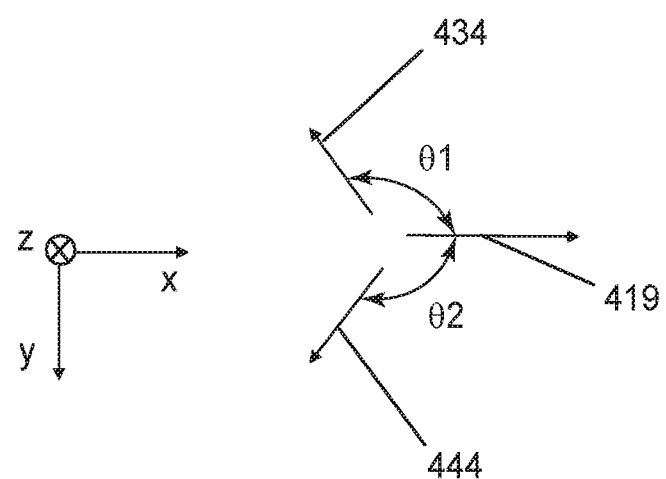
FIG. 4B illustrates first, second and third directions.

FIG. 4B is a schematic illustration of first, second and third directions 419, 434 and 444, corresponding to first, second and third directions 319, 334 and 344, respectively. An angle θ1 between the first and second directions 419 and 434 is illustrated. In some embodiments, the angle θ1 is at least 90 degrees or at least 95 degrees, and no more than 180 degrees or no more than 170 degrees. In some embodiments, the angle θ1 is between 90 and 170 degrees, for example. An angle θ2 between the first and third directions 419 and 444 is illustrated. In some embodiments, the angle θ2 is at least 90 degrees or at least 95 degrees, and no more than 180 degrees or no more than 170 degrees. In some embodiments, the angle θ2 is between 90 and 170 degrees, for example.

In alternate embodiments, the first and second reflectors are replaced by a single reflector as illustrated in FIG. 5. FIG. 5 is a schematic cross-sectional view of optical imaging system 500 including an elongated lightguide 505 extended along a length of the lightguide 505 and comprising pluralities of first, second and third light extractors 516, 510 and 520, respectively, extracting light that would otherwise be confined and propagate within the lightguide along the length of the lightguide 505 primarily by total internal reflection. The first, second and third light extractors 516, 510 and 520 form respective first, second and third patterns along the length of the lightguide 505. The light 518 extracted by the first light extractors 516 exits the lightguide primarily along a first direction 519 toward a target location 550. The light 530 extracted by the second light extractors 510 exits the lightguide primarily along a second direction 534 different from the first direction 519, and the light 540 extracted by the third light extractors 520 exits the lightguide primarily along a third direction 544 different from the first and second directions 519 and 534. A first reflector 514 is disposed such that a first portion 514a of the first reflector 514 receives light 530 exiting the lightguide 505 primarily along the second direction 534 and reflects the received light 530 toward the target location 550 forming a first virtual image 532 of the second pattern behind the first reflector 514. Light 540 extracted by the third light extractors 520 exits the lightguide 505 primarily along a third direction 544 different from the first and second directions 519 and 534. A second portion 514b of the first reflector 514 is disposed to receive light 540 exiting the lightguide 505 primarily along the third direction 544 and reflect the received light 540 toward the target location 550 forming a second virtual image 542 of the third pattern behind the second portion 514b of the first reflector 514. The first pattern and the first and second virtual images 532 and 542 are visible to a viewer 552 viewing the optical imaging system 500 from the target location 550. The first, second and third light extractors 516, 510 and 520 may correspond to the first, second and third light extractors 316, 310 and 320, respectively.

Reflector 514 is curved along a first axis (z-axis). In some embodiments, reflector 514 is curved along mutually orthogonal first and second axes (e.g., z-axis and y-axis). The reflector can be curved along an axis orthogonal to the z-axis as well as curved along the z-axis in order to aid directing the light to the desired target location 550.

Figure 6:
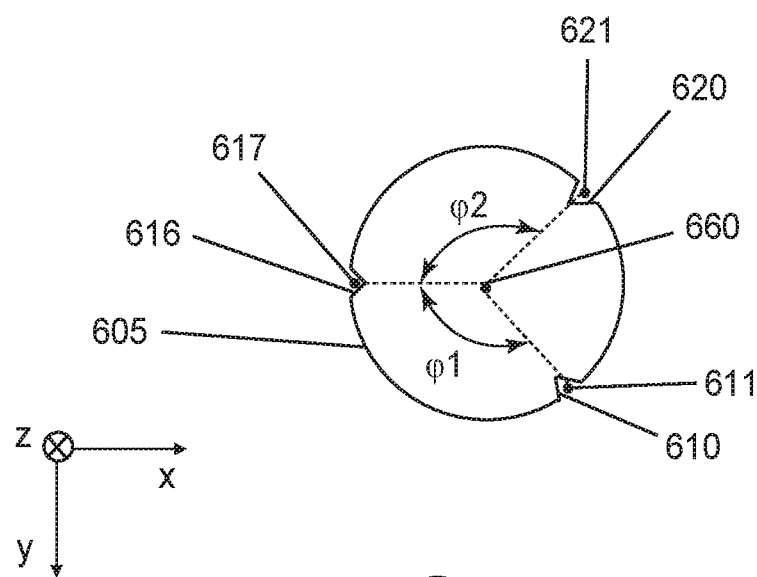
FIG. 6 is a schematic end cross-sectional view of a lightguide.

Any of the first, second and third (when present) light extractors may be arranged along respective axes (e.g., axes parallel to the z-axis). FIG. 6 is a cross-section view of elongated lightguide 605 which is centered on a main axis 660 (parallel to z-axis). Lightguide 605 includes first light extractors 616 arranged along first axis 617, second light extractors 610 arranged along second axis 611, and third light extractors 620 arranged along the third axis 621. The first, second and third axes 617, 611 and 621 are each parallel to the z-axis is the illustrated embodiment. The first and the second axes 617 and 611 subtend an angle φ1, which may be between 40 and 150 degrees, at the main axis 660. Similarly, the first and third axes 617 and 621 subtend an angle φ2, which may be between 40 and 150 degrees, at the main axis 660. The second and third axes 611 and 621 may subtend an angle (360 degrees minus the sum of φ1 and φ2) between 40 and 150 degrees at the main axis 660.

Any or all of the first, second and third light extractors (when present) may extract light primarily by scattering the light, by reflecting the light, or by refracting the light. For example, a diffuser can be applied to a portion of an exterior surface of the lightguide to extract light by scattering the light. In this case, the scattering objects (e.g., beads) in the diffuser are a plurality of light extractors that extract the light primarily by scattering the light. The light extractors may be notches or protrusions formed in an exterior surface of the lightguide. In some embodiments, at least one light extractor in the pluralities of first and second light extractors is a notch formed in an exterior surface of the lightguide, and at least one light extractor in the pluralities of first and second light extractors is a protrusion formed on the exterior surface of the lightguide. In some embodiments, at least one light extractor in the pluralities of first, second and third light extractors is a notch formed in an exterior surface of the lightguide, and at least one light extractor in the pluralities of first, second and third light extractors is a protrusion formed on the exterior surface of the lightguide. In some embodiments, each of the first, second and optionally third light extractors extracts light primarily by reflecting the light. In some embodiments, each of the first, second and optionally third light extractors extracts light primarily by refracting the light. In some embodiments, each of the first, second and optionally third light extracts light primarily by reflecting the light. In some embodiments, one or more light extractors in the first, second and optionally third light extractors extracts light primarily by one of diffusing, reflecting, or refracting the light, and a different one or more light extractors in the first, second and optionally third light extractors extracts light primarily by a different one of diffusing, reflecting, or refracting the light.

Figure 7:
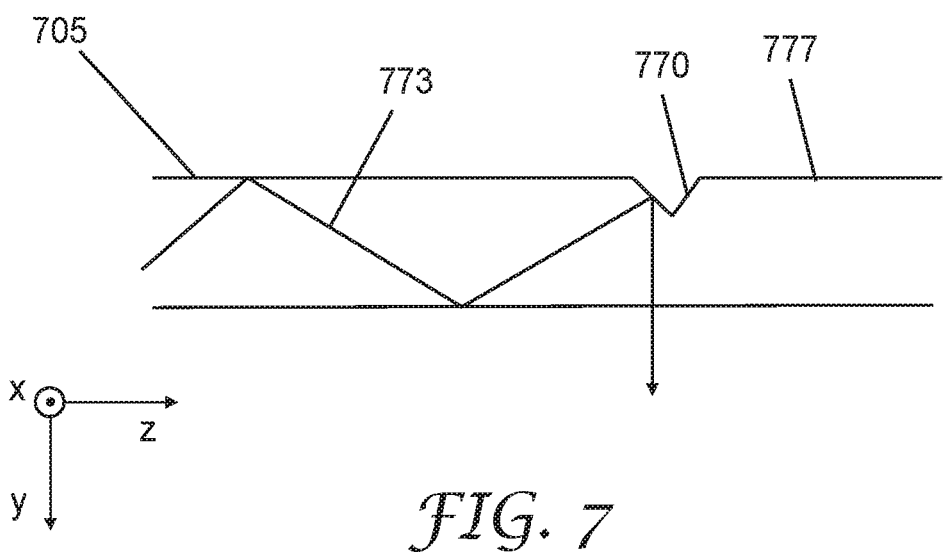
FIGS. 7-8 are schematic side cross-sectional views of lightguides.

FIG. 7 is a schematic side cross-sectional view of lightguide 705 including a light extractor 770 which is a notch formed in exterior surface 777 of lightguide 705. Light 773 propagates within the lightguide 705 and is confined within the lightguide 705 primarily by total internal reflection. Light 773 is extracted from the lightguide 705 by reflection of the light from light extractor 770. Light extractor 770 may correspond to a light extractor in any of the pluralities of first, second or third light extractors described elsewhere herein.

Figure 8:
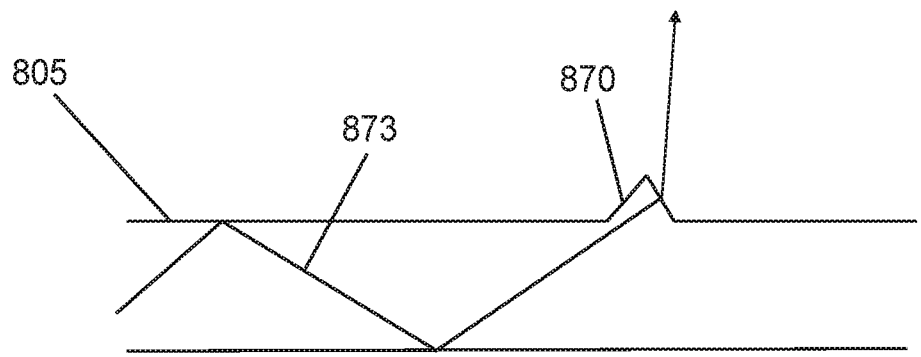

FIG. 8 is a schematic side cross-sectional view of lightguide 805 including a light extractor 870 which is a protrusion formed on exterior surface 877 of lightguide 805. Light 873 propagates within the lightguide 805 and is confined within the lightguide 805 primarily by total internal reflection. Light 873 is extracted from the lightguide 805 by refraction of the light from light extractor 870. Light extractor 870 may correspond to a light extractor in any of the pluralities of first, second or third light extractors described elsewhere herein.

Exemplary patterns provided by light extractors are illustrated in FIGS. 9-12. The first, second or third patterns provided by respective first, second or third light extractors (when present) of the optical imaging systems described herein may correspond to any of these patterns. In some embodiments, the first pattern is substantially the same as the second pattern (e.g., the first and second patterns may be nominally the same but may have some differences due to ordinary manufacturing variations). In some embodiments, the first pattern is different from the second pattern. In some embodiments, the first pattern is substantially the same as the third pattern. In some embodiments, the first pattern is different from the third pattern.

Figure 9:
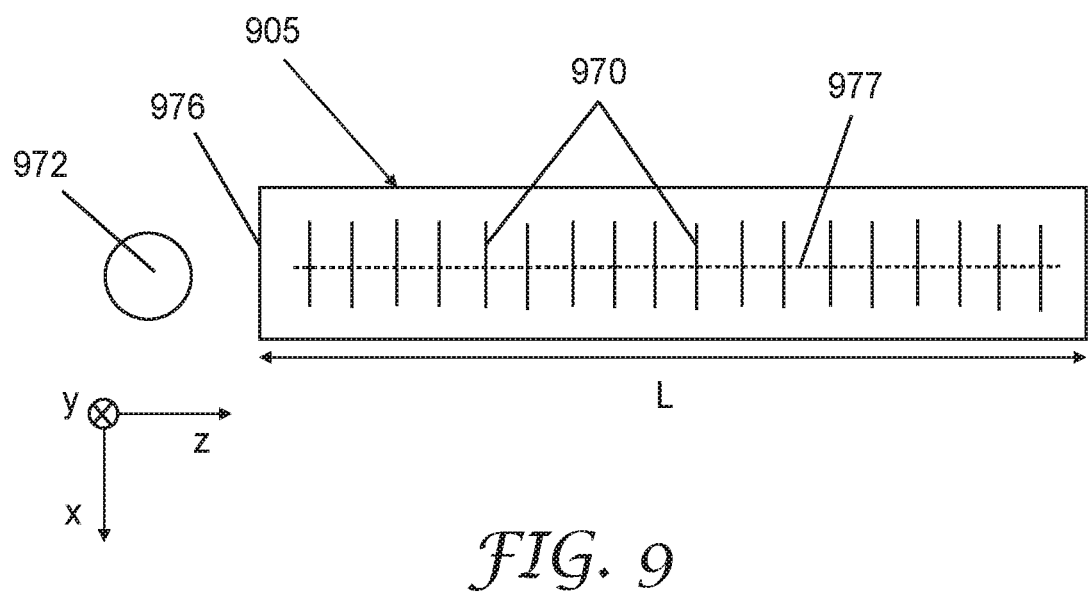
FIGS. 9-13 are schematic top views of lightguides.

FIG. 9 is a schematic top view of lightguide 905 extending along a length L of the lightguide 905 and including a plurality of light extractors 970, which may correspond to any of the pluralities of first, second or third light extractors described elsewhere herein. The light extractors 970 are discrete and spaced apart and arranged along an axis 977 along the length L of the lightguide 905. Light extractors 970 are arranged in a straight line pattern along the axis 977. In some embodiments, the light extractors 970 are arranged regularly along the length L of the lightguide 905 and in some embodiments, the light extractors 970 are arranged randomly along the length L of the lightguide 905. A light source 972 is disposed at an end 976 of the lightguide 905.

Figure 10:
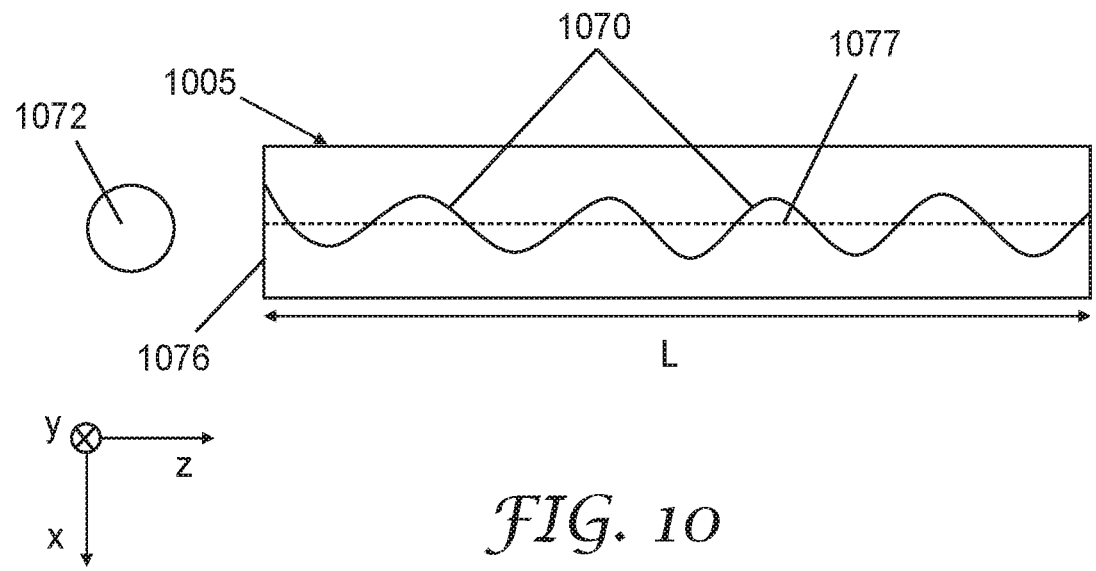

FIG. 10 is a schematic top view of lightguide 1005 extending along a length L of the lightguide 1005 and including a plurality of light extractors 1070, which may correspond to any of the pluralities of first, second or third light extractors described elsewhere herein. Light extractors 1070 are arranged in a wavy line pattern along an axis 1077. In some embodiments, the wavy line pattern is a sinusoidal pattern. In some embodiments, light extractors 1070 comprise a plurality of spaced apart notches arranged along the length of the wavy line (e.g., a plurality of short, closely spaced lines defining the wavy line). In other embodiments, the wavy line is a continuous feature made in the surface of the lightguide 1005 (e.g., a continuous notch made by molding or by laser ablation or a continuous protrusion made by molding), and a plurality of sections of the feature (e.g., sections between portions of a continuous notch parallel to a main axis of the lightguide 1005) are a plurality of light extractors. In this case, the plurality of light extractors 1070 may be described as interconnected. A light source 1072 is disposed at an end 1076 of the lightguide 1005.

Figure 11:
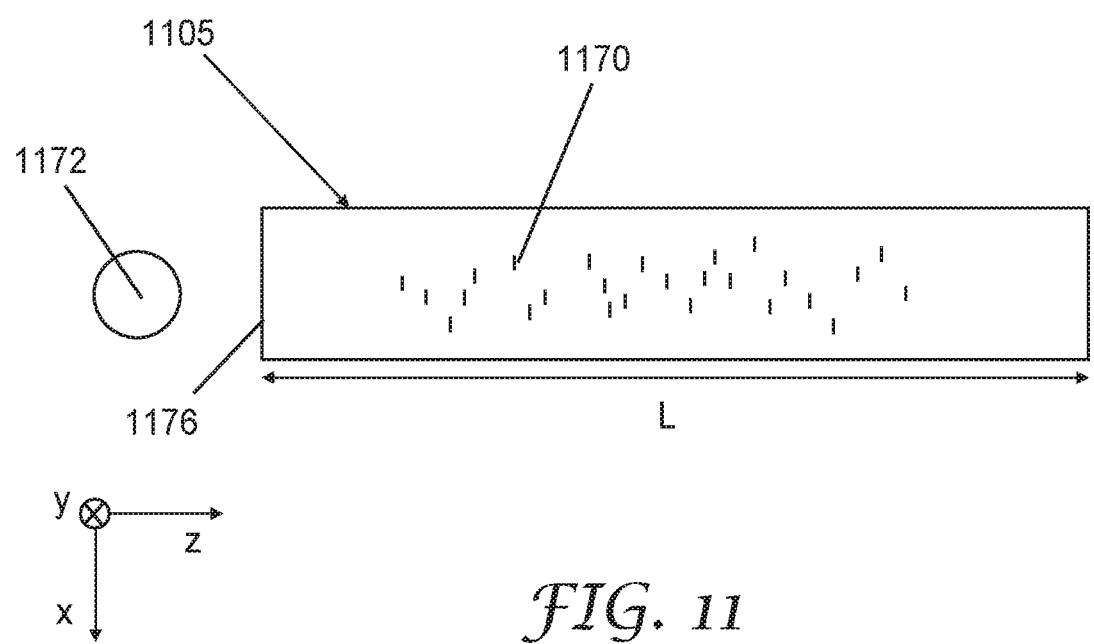

FIG. 11 is a schematic top view of lightguide 1105 extending along a length L of the lightguide 1105 and including a plurality of light extractors 1170, which may correspond to any of the pluralities of first, second or third light extractors described elsewhere herein. Light extractors 1170 are arranged randomly along the length L of the lightguide 1105. A light source 1172 is disposed at an end 1176 of the lightguide 1105.

Figure 12:
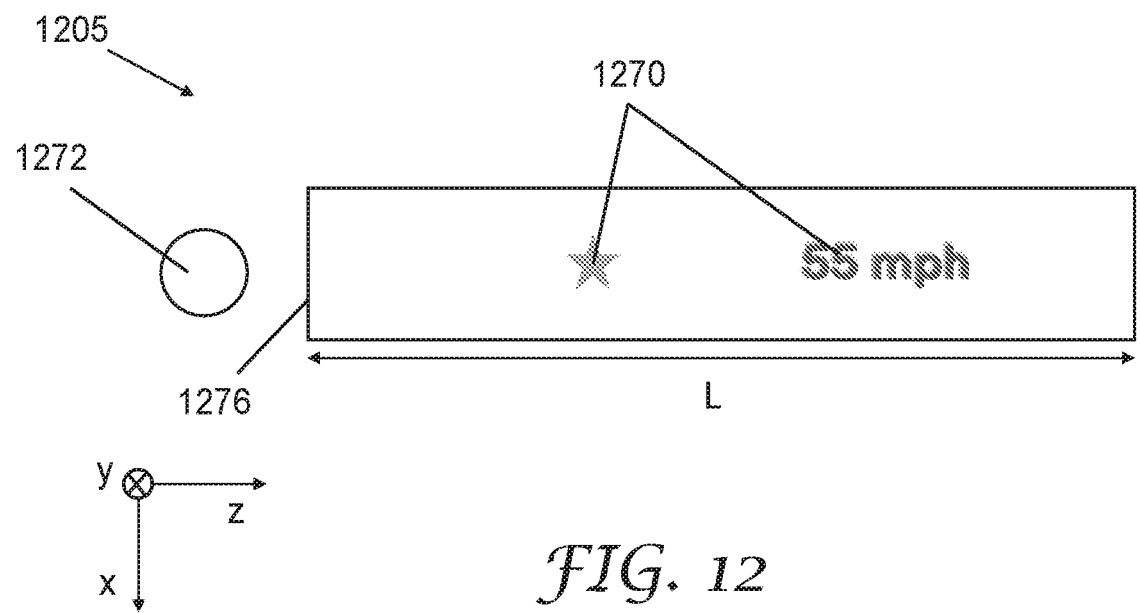

FIG. 12 is a schematic top view of lightguide 1205 extending along a length L of the lightguide 1205 and including a plurality of light extractors forming indicia 1270. The plurality of light extractors may correspond to any of the pluralities of first, second or third light extractors described elsewhere herein. A light source 1272 is disposed at an end 1276 of the lightguide 1205. The light extractors may be diffusers disposed on an exterior surface of the lightguide 1205 to extract the light by scattering the light, or may be notches and/or protrusions arranged to form the desired indicia 1270. The indicia 1270 may include one or more of a letter, a text or a logo. For example, indicia 1270 may include a logo, such as the illustrated star, and/or may include a text message, such as a speed or warning message in automotive applications.

Figure 13:
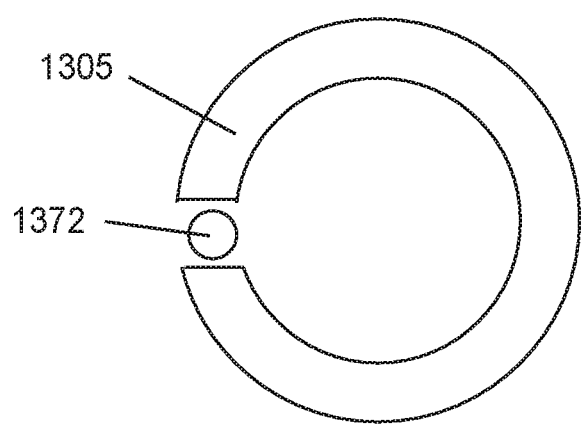

In some embodiments, the lightguide of the optical imaging system extends linearly along the length of the lightguide. In other embodiments, the lightguide extends along a curve. FIG. 13 is a schematic top view of toroidal lightguide 1305 with a light source 1372 disposed to inject light into both ends of the lightguide 1305.

Figure 14:
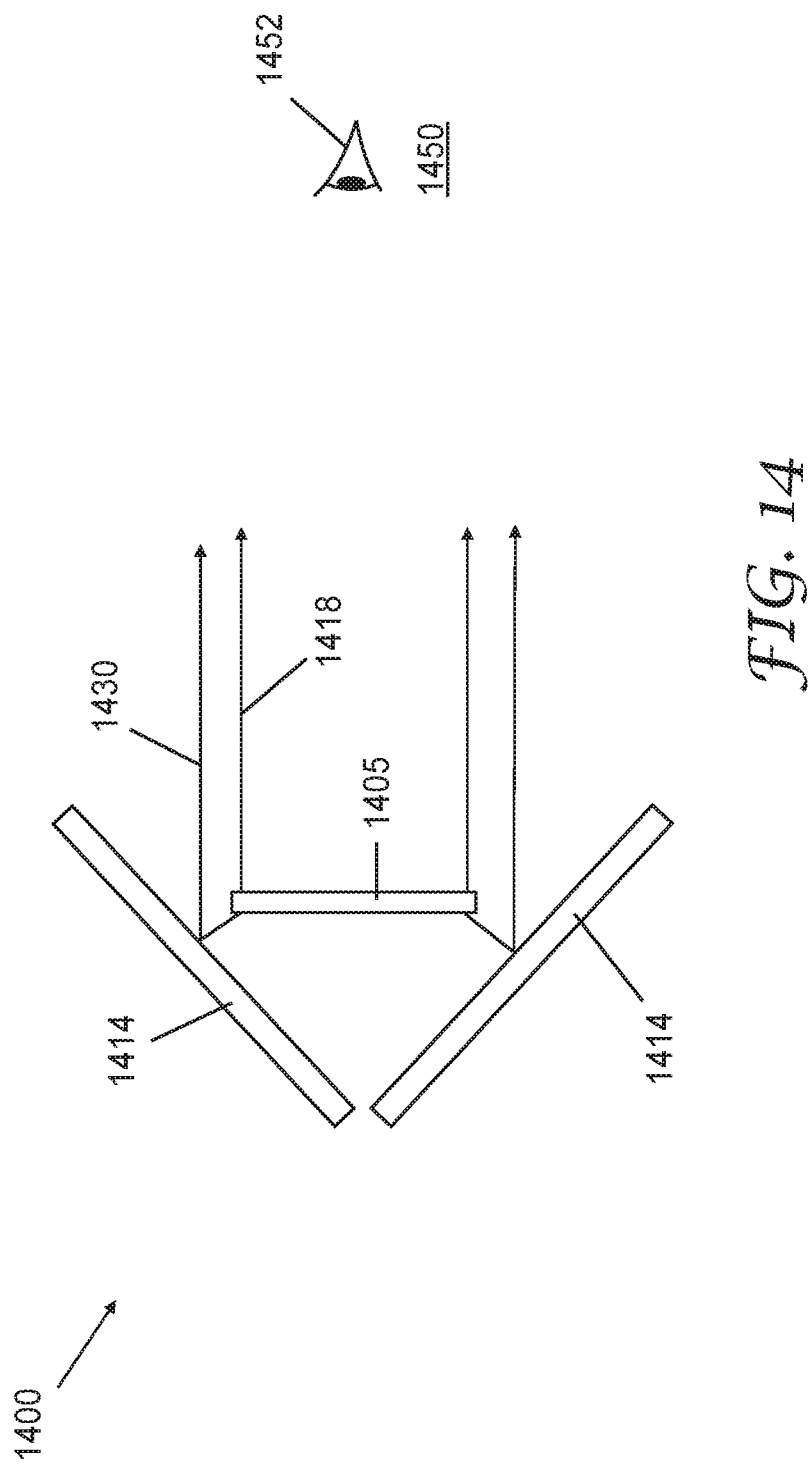
FIG. 14 is a schematic side cross-sectional view of optical imaging system.

FIG. 14 is a side cross-sectional view of optical imaging system 1400 including toroidal lightguide 1405, which corresponds to toroidal lightguide 1305, and conic reflector 1414. In the illustrated embodiment, lightguide 1405 includes a plurality of first light extractors configured to extract light 1418 towards a target location 1450 and a plurality of second light extractors configured to extract light 1430 towards the reflector 1414 which redirects the light towards the target location 1450 and forms a virtual image of a pattern defined by the second light extractors behind the reflector 1414. Patterns created by the pluralities of first and second light extractors are viewable at the target location 1450 by viewer 1452.

Figure 15:
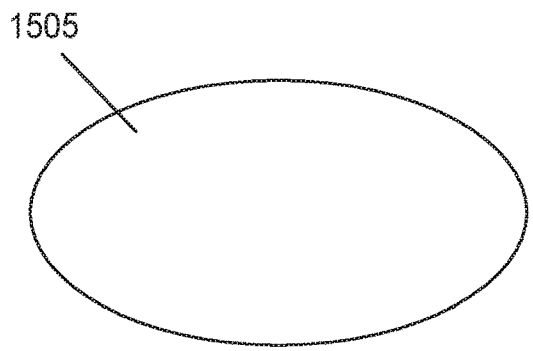
FIGS. 15-17 are schematic end cross-sectional views of lightguides.
Figure 16:
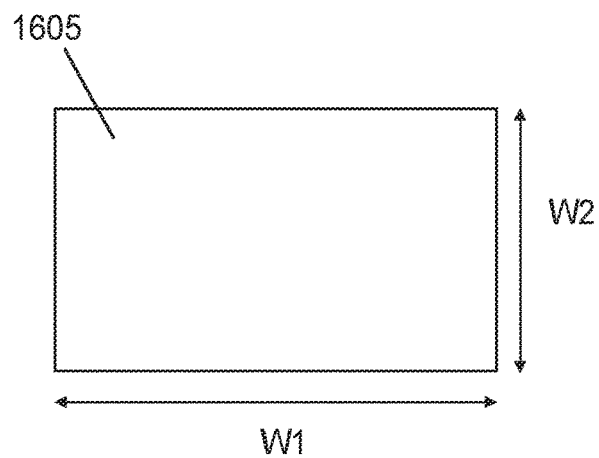
Figure 17:
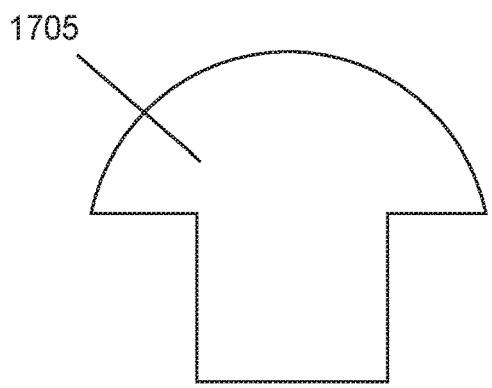

In some embodiments, the lightguide has a circular cross-section in a direction perpendicular to the length of the lightguide, as illustrated in FIGS. 1-3, for example. In other embodiments, the lightguide has other cross-sections. FIG. 15 is a schematic cross-sectional view of an elliptical lightguide 1505 in a direction perpendicular to the length of the lightguide 1505. It will be understood that a circular cross-section is a special case of an elliptical cross-section where the major and minor diameters of the ellipse are equal. In some embodiments, the major and minor diameters are different, and in some embodiments, the major and minor diameters are equal. FIG. 16 is a schematic cross-sectional view of a rectangular lightguide 1605 in a direction perpendicular to the length of the lightguide 1605. The rectangular cross-section has dimensions W1 and W2 which may be equal (i.e., the rectangular cross-section may be a square cross-section) or may be different. FIG. 17 is a schematic cross-sectional view of a mushroom shaped lightguide 1705 in a direction perpendicular to the length of the lightguide 1705. The mushroom shape can be described as a portion of a sphere or ellipse formed with a square or a rectangle.

The following is a list of exemplary embodiments of the present description.

Embodiment 1 is an optical imaging system, comprising:
an elongated lightguide extended along a length of the lightguide and comprising pluralities of first and second light extractors extracting light that would otherwise be confined and propagate within the lightguide along the length of the lightguide primarily by total internal reflection, the first and second light extractors forming respective first and second patterns along the length of the lightguide, light extracted by the first light extractors exiting the lightguide primarily along a first direction toward a target location, light extracted by the second light extractors exiting the lightguide primarily along a second direction different from the first direction; and
a first reflector for receiving light exiting the lightguide primarily along the second direction and reflecting the received light toward the target location, the first reflector forming a first virtual image of the second pattern behind the first reflector, the first pattern and the first virtual image being visible to a viewer viewing the optical imaging system from the target location.

Embodiment 2 is the optical imaging system of Embodiment 1, wherein the elongated lightguide has a rectangular, elliptical, or mushroom shaped cross-section in a direction perpendicular to the length of the lightguide.

Embodiment 3 is the optical imaging system of Embodiment 2, wherein the elongated lightguide has a circular cross-section in the direction perpendicular to the length of the lightguide.

Embodiment 4 is the optical imaging system of Embodiment 1, wherein at least some light extractors in the pluralities of first and second light extractors are interconnected.

Embodiment 5 is the optical imaging system of Embodiment 1, wherein the first light extractors are discrete and spaced apart and arranged along a first axis along the length of the lightguide, and the second light extractors are discrete, spaced apart and arranged along a different second axis along the length of the lightguide.

Embodiment 6 is the optical imaging system of Embodiment 5, wherein the elongated lightguide is centered on a main axis, and wherein the first and the second axes subtend an angle between 40 and 150 degrees at the main axis.

Embodiment 7 is the optical imaging system of Embodiment 1, wherein each first and second light extractor is a notch formed in an exterior surface of the lightguide.

Embodiment 8 is the optical imaging system of Embodiment 1, wherein each first and second light extractor is a protrusion formed on an exterior surface of the lightguide.

Embodiment 9 is the optical imaging system of Embodiment 1, wherein at least one light extractor in the pluralities of first and second light extractors is a notch formed in an exterior surface of the lightguide, and at least one other light extractor in the pluralities of first and second light extractors is a protrusion formed on the exterior surface of the lightguide.

Embodiment 10 is the optical imaging system of Embodiment 1, wherein each of the first and second light extractors extracts light primarily by scattering the light.

Embodiment 11 is the optical imaging system of Embodiment 1, wherein each of the first and second light extractors extracts light primarily by reflecting the light.

Embodiment 12 is the optical imaging system of Embodiment 1, wherein each of the first and second light extractors extracts light primarily by refracting the light.

Embodiment 13 is the optical imaging system of Embodiment 1, wherein at least one of the first and second patterns comprises a straight line pattern.

Embodiment 14 is the optical imaging system of Embodiment 1, wherein at least one of the first and second patterns comprises a wavy line pattern.

Embodiment 15 is the optical imaging system of Embodiment 1, wherein at least one of the first and second patterns comprises an indicia.

Embodiment 16 is the optical imaging system of Embodiment 15, wherein the indicia comprises one or more of a letter, a text or a logo.

Embodiment 17 is the optical imaging system of Embodiment 1, wherein when viewed by a viewer, the first pattern and the first virtual image are substantially equally bright.

Embodiment 18 is the optical imaging system of Embodiment 1, wherein the light extractors in at least one of the pluralities of first and second light extractors are arranged randomly along the length of the lightguide.

Embodiment 19 is the optical imaging system of Embodiment 1, wherein the light extractors in each of the pluralities of first and second light extractors are arranged regularly along the length of the lightguide.

Embodiment 20 is the optical imaging system of Embodiment 1, further comprising a light source at an end of the elongated lightguide.

Embodiment 21 is the optical imaging system of Embodiment 1, wherein an angle between the first and second directions is between 90 and 170 degrees.

Embodiment 22 is the optical imaging system of Embodiment 1, wherein light extracted by the second light extractors exits the lightguide away from the target location.

Embodiment 23 is the optical imaging system of Embodiment 1, wherein the first reflector is planar.

Embodiment 24 is the optical imaging system of Embodiment 1, wherein the first reflector is curved along a first axis.

Embodiment 25 is the optical imaging system of Embodiment 1, wherein the first reflector is curved along mutually orthogonal first and second axes.

Embodiment 26 is the optical imaging system of Embodiment 1, wherein the first reflector and the elongated lightguide are parallel.

Embodiment 27 is the optical imaging system of Embodiment 1, wherein the first reflector and the elongated lightguide are not parallel.

Embodiment 28 is the optical imaging system of Embodiment 1, wherein the lightguide is disposed between the first reflector and the target location.

Embodiment 29 is the optical imaging system of Embodiment 1, wherein the first reflector is elongated along the length of the lightguide.

Embodiment 30 is the optical imaging system of Embodiment 1, wherein the lightguide is substantially straight.

Embodiment 31 is the optical imaging system of Embodiment 1, wherein at least a portion of the lightguide is curved.

Embodiment 32 is the optical imaging system of Embodiment 1, wherein the lightguide is toroidal.

Embodiment 33 is the optical imaging system of Embodiment 1, wherein the first pattern is substantially the same as the second pattern.

Embodiment 34 is the optical imaging system of Embodiment 1, wherein the first pattern is different from the second pattern.

Embodiment 35 is the optical imaging system of Embodiment 1, wherein the elongated lightguide further comprises a plurality of third light extractors forming a third pattern along the length of the lightguide, light extracted by the third light extractors exiting the lightguide primarily along a third direction different from the first and second directions.

Embodiment 36 is the optical imaging system of Embodiment 35 further comprising a second reflector for receiving light exiting the lightguide primarily along the third direction and reflecting the received light toward the target location, the second reflector forming a second virtual image of the third pattern behind the second reflector, the first pattern and the first and second virtual images being visible to a viewer viewing the optical imaging system from the target location.

Embodiment 37 is the optical imaging system of Embodiment 36, wherein the first and second reflectors are not parallel to one another.

Embodiment 38 is the optical imaging system of Embodiment 36, wherein the first and second reflectors and the elongated lightguide are parallel.

Embodiment 39 is the optical imaging system of Embodiment 36, wherein the first and second reflectors and the elongated lightguide are not parallel to one another.

Embodiment 40 is the optical imaging system of Embodiment 36, wherein an angle between the first and second reflectors is between 90 and 180 degrees.

Embodiment 41 is the optical imaging system of Embodiment 35, wherein a first portion of the first reflector is disposed to receive light exiting the lightguide primarily along the second direction and to reflect the received light toward the target locations, and a second portion of the first reflector is disposed to receive light exiting the lightguide primarily along the third direction and to reflect the received light toward the target location, the second portion of the first reflector forming a second virtual image of the third pattern behind the second portion of the first reflector, the first pattern and the first and second virtual images being visible to a viewer viewing the optical imaging system from the target location.

Embodiment 42 is the optical imaging system of Embodiment 41, wherein the first reflector is curved along a first axis.

Embodiment 43 is the optical imaging system of Embodiment 41, wherein the first reflector is curved along mutually orthogonal first and second axes.

Embodiment 44 is the optical imaging system of any one of Embodiments 35 to 43, wherein when viewed by a viewer, the first pattern and the second virtual image are substantially equally bright.

Embodiment 45 is the optical imaging system of Embodiment 35, wherein at least some light extractors in the pluralities of first, second and third light extractors are interconnected.

Embodiment 46 is the optical imaging system of Embodiment 35, wherein the third light extractors are discrete and spaced apart and arranged along a third axis along the length of the lightguide.

Embodiment 47 is the optical imaging system of Embodiment 46, wherein the elongated lightguide is centered on a main axis, and wherein the first and the third axes subtend an angle between 40 and 150 degrees at the main axis.

Embodiment 48 is the optical imaging system of Embodiment 35, wherein each third light extractor is a notch formed in an exterior surface of the lightguide.

Embodiment 49 is the optical imaging system of Embodiment 35, wherein each third light extractor is a protrusion formed on an exterior surface of the lightguide.

Embodiment 50 is the optical imaging system of Embodiment 35, wherein at least one light extractor in the pluralities of first, second and third light extractors is a notch formed in an exterior surface of the lightguide, and at least one other light extractor in the pluralities of first, second and third light extractors is a protrusion formed on the exterior surface of the lightguide.

Embodiment 51 is the optical imaging system of Embodiment 35, wherein each of the third light extractors extracts light primarily by scattering the light.

Embodiment 52 is the optical imaging system of Embodiment 35, wherein each of the third light extractors extracts light primarily by reflecting the light.

Embodiment 53 is the optical imaging system of Embodiment 35, wherein each of the third light extractors extracts light primarily by refracting the light.

Embodiment 54 is the optical imaging system of Embodiment 35, wherein at least one of the first, second and third patterns comprises a straight line pattern.

Embodiment 55 is the optical imaging system of Embodiment 35, wherein at least one of the first, second and third patterns comprises a wavy line pattern.

Embodiment 56 is the optical imaging system of Embodiment 35, wherein at least one of the first, second and third patterns comprises an indicia.

Embodiment 57 is the optical imaging system of Embodiment 56, wherein the indicia comprises one or more of a letter, a text or a logo.

Embodiment 58 is the optical imaging system of Embodiment 35, wherein the light extractors in at least one of the pluralities of first, second and third light extractors are arranged randomly along the length of the lightguide.

Embodiment 59 is the optical imaging system of Embodiment 35, wherein the light extractors in each of the pluralities of first, second and third light extractors are arranged regularly along the length of the lightguide.

Embodiment 60 is the optical imaging system of Embodiment 35, wherein an angle between the first and third directions is between 90 and 170 degrees.

Embodiment 61 is the optical imaging system of Embodiment 35, wherein light extracted by the third light extractors exits the lightguide away from the target location.

Embodiment 62 is the optical imaging system of Embodiment 35, wherein the first pattern is substantially the same as the third pattern.

Embodiment 63 is the optical imaging system of Embodiment 35, wherein the first pattern is different from the third pattern.

Embodiment 64 is an optical imaging system, comprising:

an elongated lightguide comprising a plurality of first light extractors forming a first pattern, the first light extractors configured to extract light propagating within the lightguide, the extracted light propagating away from a target location; and an elongated first reflector coextensive with the lightguide and forming a first virtual image of the first pattern, such that the extracted light is redirected by the first reflector toward the target location making the first virtual image viewable at the target location.

Embodiment 65 is the optical imaging system of Embodiment 64, wherein the elongated lightguide further comprises a plurality of second light extractors forming a second pattern along the length of the lightguide, the second light extractors configured to extract light propagating within the lightguide.

Embodiment 66 is the optical imaging system of Embodiment 65, wherein the light extracted by the first light extractors exits the lightguide primarily along a first direction and the light extracted by the second light extractors exits the lightguide primarily along a second direction different from the first direction.

Embodiment 67 is the optical imaging system of Embodiment 66, further comprising an elongated second reflector coextensive with the lightguide for receiving light exiting the lightguide primarily along the second direction and reflecting the received light toward the target location, the second reflector forming a second virtual image of the second pattern behind the second reflector, the first pattern and the first and second virtual images being visible to a viewer viewing the optical imaging system from the target location.

Embodiment 68 is the optical imaging system of Embodiment 67, wherein the first and second reflectors are not parallel to one another.

Embodiment 69 is the optical imaging system of Embodiment 67, wherein an angle between the first and second reflectors is between 90 and 180 degrees.

Embodiment 70 is the optical imaging system of Embodiment 66, wherein a first portion of the first reflector is disposed to receive light exiting the lightguide primarily along the first direction and to reflect the received light toward the target location, and a second portion of the first reflector is disposed to receive light exiting the lightguide primarily along the second direction and to reflect the received light toward the target location, the second portion of the first reflector forming a second virtual image of the second pattern behind the second portion of the first reflector, the first and second virtual images being visible to a viewer viewing the optical imaging system from the target location.

Embodiment 71 is the optical imaging system of Embodiment 66, wherein the elongated lightguide further comprises a plurality of third light extractors forming a third pattern along the length of the lightguide, the third light extractors configured to extract light propagating within the lightguide, wherein the light extracted by the third light extractors exits the lightguide primarily along a third direction different from the first and second directions.

EXAMPLES

Example 1

An acrylic rod with 7 mm diameter was used as a lightguide. Three sinusoidal curves were made on the exterior surface of the lightguide using laser ablation. Each of the sinusoidal curves were similar to the wavy line pattern shown in FIG. 10 and were arranged relative to each other as illustrated for first, second and third light extractors 516, 510 and 520 in FIG. 5. A single LED (OSRAM CN7N) was attached to one end of the lightguide, and a folded reflector (similar to first reflector 514) was placed behind the rod. When the LED was illuminated, each of the three sinusoidal curves were visible at the viewing location with good perceived depth between the sinusoidal curves. The sinusoidal curves appeared to be parallel when the reflector was parallel with the lightguide and appeared to be converging when the reflector was non-parallel with the lightguide.

Example 2

An acrylic rod with 7 mm diameter was used as a lightguide. Three different patterns were made in the exterior surface of the lightguide using laser ablation. The patterns approximately corresponded to the patterns illustrated in FIGS. 9, 10 and 11, respectively, and were arranged relative to each other as illustrated for first, second and third light extractors 516, 510 and 520 in FIG. 5. A single LED (OSRAM CN7N) was attached to one end of the lightguide, and a folded reflector (similar to first reflector 514) was placed behind the lightguide. When the LED was illuminated, each of the three sinusoidal curves were visible at the viewing location with good perceived depth between the patterns.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical imaging system, comprising:
an elongated lightguide extended along a length of the lightguide and comprising pluralities of first and second light extractors extracting light that would otherwise be confined and propagate within the lightguide along the length of the lightguide primarily by total internal reflection, the first and second light extractors forming respective first and second patterns along the length of the lightguide, light extracted by the first light extractors exiting the lightguide primarily along a first direction toward a target location, light extracted by the second light extractors exiting the lightguide primarily along a second direction different from the first direction; and
a first reflector for receiving light exiting the lightguide primarily along the second direction and reflecting the received light toward the target location, the first reflector forming a first virtual image of the second pattern behind the first reflector, the first pattern and the first virtual image being visible to a viewer viewing the optical imaging system from the target location such that the optical imaging system provides a perceived depth of the first and second patterns to the viewer.

2. The optical imaging system of claim 1, wherein the first light extractors are discrete and spaced apart and arranged along a first axis along the length of the lightguide, and the second light extractors are discrete, spaced apart and arranged along a different second axis along the length of the lightguide.

3. The optical imaging system of claim 2, wherein the elongated lightguide is centered on a main axis, and wherein the first and the second axes subtend an angle between 40 and 150 degrees at the main axis.

4. The optical imaging system of claim 1, wherein at least one of the first and second patterns comprises one or more of a letter, a text or a logo.

5. The optical imaging system of claim 1, further comprising a light source at an end of the elongated lightguide.

6. The optical imaging system of claim 1, wherein light extracted by the second light extractors exits the lightguide away from the target location.

7. The optical imaging system of claim 1, wherein the lightguide is disposed between the first reflector and the target location.

8. The optical imaging system of claim 1, wherein the elongated lightguide further comprises a plurality of third light extractors forming a third pattern along the length of the lightguide, light extracted by the third light extractors exiting the lightguide primarily along a third direction different from the first and second directions.

9. The optical imaging system of claim 8 further comprising a second reflector for receiving light exiting the lightguide primarily along the third direction and reflecting the received light toward the target location, the second reflector forming a second virtual image of the third pattern behind the second reflector, the first pattern and the first and second virtual images being visible to a viewer viewing the optical imaging system from the target location.

10. The optical imaging system of claim 8, wherein a first portion of the first reflector is disposed to receive light exiting the lightguide primarily along the second direction and to reflect the received light toward the target locations, and a second portion of the first reflector is disposed to receive light exiting the lightguide primarily along the third direction and to reflect the received light toward the target location, the second portion of the first reflector forming a second virtual image of the third pattern behind the second portion of the first reflector, the first pattern and the first and second virtual images being visible to a viewer viewing the optical imaging system from the target location.

* * * * *